(12) United States Patent
Connor

(10) Patent No.: US 7,164,678 B2
(45) Date of Patent: Jan. 16, 2007

(54) CONTROL OF PROCESSING ORDER FOR RECEIVED NETWORK PACKETS

(75) Inventor: Patrick L. Connor, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1001 days.

(21) Appl. No.: 09/891,574

(22) Filed: Jun. 25, 2001

(65) Prior Publication Data

US 2002/0196785 A1 Dec. 26, 2002

(51) Int. Cl.
*H04L 12/28* (2006.01)
(52) U.S. Cl. .................. 370/392; 370/412; 370/468
(58) Field of Classification Search ............. 370/392, 370/412, 413, 415, 428, 468
See application file for complete search history.

(56) References Cited

U.S. PATENT DOCUMENTS

| | | | | |
|---|---|---|---|---|
| 5,699,519 A | * | 12/1997 | Shiobara | 709/235 |
| 5,926,458 A | * | 7/1999 | Yin | 370/230 |
| 5,999,541 A | * | 12/1999 | Hinchey et al. | 370/466 |
| 6,091,709 A | * | 7/2000 | Harrison et al. | 370/235 |
| 6,404,772 B1 | * | 6/2002 | Beach et al. | 370/443 |
| 6,438,135 B1 | * | 8/2002 | Tzeng | 370/412 |
| 6,633,575 B1 | * | 10/2003 | Koodli | 370/412 |

OTHER PUBLICATIONS

Layer 2 Traffic Prioritization, Network prioritization using Intel PRO/100+Fast Ethernet Adapters, 1999, pp. 1-8.
Josh McHugh, "The n—Dimensional Superswitch, Larry Roberts has a next-gen router he says will kick Cisco's ass—oh yeah, and reinvent the Internet", Wired Archive/9.05/May 2001/Feature, pp. 1-7, http://www./wired.com/wired/archive/9.05/caspian_pr.html.

* cited by examiner

*Primary Examiner*—Ricky Q. Ngo
*Assistant Examiner*—Richard Chang
(74) *Attorney, Agent, or Firm*—Philip A. Pedigo

(57) ABSTRACT

The present invention provides for controlling the order in which packets received from across a network may be processed. A receiver station examines the packets and determines a property of the packet. A priority level is associated with the packet prior to processing. The packet is placed into a queue and processed in an order based at least in part on its priority level. The method may be used to expedite or slow the processing of particular packets, such as advancing the processing order for acknowledgment packets. In addition, other aspects of the present invention relating to determining an order for processing packets by a receiver station.

24 Claims, 8 Drawing Sheets

CONTROL OF PROCESSING ORDER FOR RECEIVED NETWORK PACKETS

FIELD OF THE INVENTION

The present invention relates generally to controlling the processing order for packets received from a network. In particular, this invention is related to redefining the priorities for processing incoming packets based on one or more properties of the packet.

BACKGROUND

Networks often provide a multi-session environment for delivering a mixture of various types of critical and non-critical data, such as acknowledgments, e-mail messages, file transfers, database queries, voice over IP, video conferencing and multimedia, etc. Prior to transfer of the data into the network, this data is packaged into one or a plurality of units, i.e. packets. A stream of packets having various data may be acquired by the packet's final designation at the terminal end of a communication path and, at times, also by intermediate nodes along the path. The term "packet," as referred to herein, is not intended to imply use of any particular communications protocol.

The transfer of large amounts of data places a demand on a network's infrastructure, which may result in slowed receipt and consequently deferred processing of data once received. Delays may be caused, inter alia, by congestion along the communication path and the time a packet spends in a queue waiting to be processed.

Oftentimes, packets are removed from the queue and processed in the sequential order in which they were inserted into the queue or according to pre-designated priorities. However, periodically it is useful to change the priority of processing certain packets of data once the packets are received.

One example of a packet that may benefit from expedited processing is an acknowledgment packet received in response to data sent. An acknowledgment is transmitted to an original data sender by a receiver station to confirm that data was successfully obtained. In order to reduce congestion of packets at the sending end, some network systems or protocols, e.g. Transmission Control Protocol (TCP), limit dispatch to a number of bytes that a receiver station may accept over a given time. Upon receipt of the acknowledgement, the sender is permitted to release more data.

The maximum throughput over a network is a product of the delay created by a receiver station's window size divided by a round trip time (RTT). The RTT is the length of time before an acknowledgment can be received for any given data sent. However, acknowledgment packets are generally queued behind other previously received packets. The resulting latency in processing acknowledgments is especially significant in high throughput environments, such as a server, where each connection to the receiver adds an extra load and, as a consequence, incrementally increases the RTT of all connections on the link. Thus, the throughput of each connection is reduced.

In addition to acknowledgments, other data may benefit from priority processing. An end-to-end transit delay encountered for individual packets has an additive effect on a user's perceived response time for transfer of a body of data. For example, delayed processing of packets having streaming data, such as teleconferencing, video and audio data usually results in a jittery effect for the streaming data, thereby reducing the quality of the resulting received data.

However, most current methods to prioritize packets do not permit different priorities for each packet carrying a portion of a body of data. Rather than differentiating each packet of a data stream, most present prioritization methods label all packets that transport a body of data, e.g. a file, as the same priority. Thus, a priority value in these prior systems represents the file priority based on overall packet content, rather than an individual packet's ranking of precedence.

Furthermore, current stations that receive packets are limited in their ability to reorder the processing of packets. It is often useful for the receiving end of data sent across a network to process packets in a different priority than the priorities that had been set at the point of transmission. Moreover, systems in which the transmitter stations set priorities often require that all other stations along the network path to be compatible with the transmitter station priority system. Thus, any changes made to the priority system must also be made to these other nodes.

In the case of a router or switch, if prioritization occurs, the priority may be set after the packet is given to a protocol stack and just before the packet is relayed back into the network. There may be heavy reliance on software to designate priorities, creating an undue burden on the station's central processing unit and adding to the complexity of the processing procedures.

In general, the shortcomings of the currently available methods for prioritizing network information are inadequate for creating different priorities on individual packet members carrying a body of data, regardless of packet content. In particular, previous methods do not efficiently permit a receiver station's hardware to be used in controlling the order of processing select packets.

BRIEF DESCRIPTION OF THE DRAWINGS

The present invention is illustrated by way of example, and not limitation, in the figures of the accompanying drawings in which:

FIGS. 1A and 1B are block diagrams illustrating a network system having embodiments of receiver station that prioritizes processing of packets arriving from a transmitter station, wherein FIG. 1A shows a receiver station that may place packets into multiple queues and FIG. 1B shows a receiver station that may attach a packet description to a packet, in accordance with the teachings presented herein.

FIGS. 3A and 3B are flow charts depicting exemplary methods for prioritizing packets, wherein FIG. 3A shows the use ordering of processing by use of multiple queues and FIG. 3B shows ordering the processing of packets through the multiple queues, in accordance with the teachings presented herein.

FIGS. 4A and 4B are flow charts depicting exemplary methods for prioritizing packets, wherein FIG. 4A shows the association of packet descriptions and FIG. 4B shows the use of packet descriptions in ordering the processing of packets, in accordance with the teachings presented herein.

DETAILED DESCRIPTION

The present invention provides a priority system that enables a receiver station to establish an order for processing particular packets received from a network. The receiver station may examine a packet and associate a priority level for the packet based on one or more properties of the packet. The packet is placed into a queue and processed in an order based, at least in part, on its priority level. In this manner, some packets may be processed quicker and/or other packets may be processed slower. In one example, acknowledgment packet processing is expedited, resulting in an accelerated overall response time and increased performance of the receiver station. Furthermore, there may be avoided the necessity for other nodes along the network pathway leading to the receiver station to be compatible with this priority system.

Figure 1A:
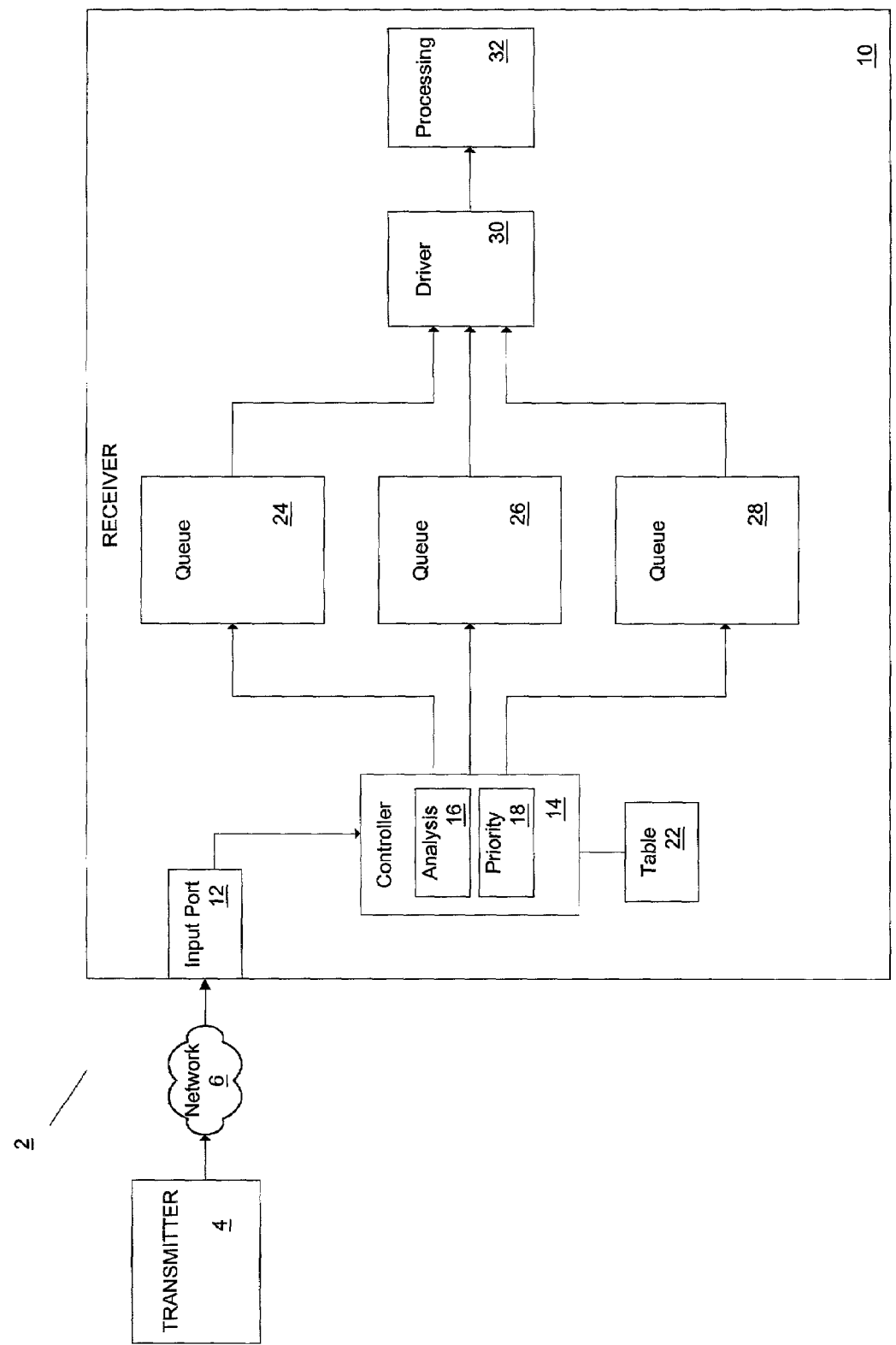
Figure 1B:
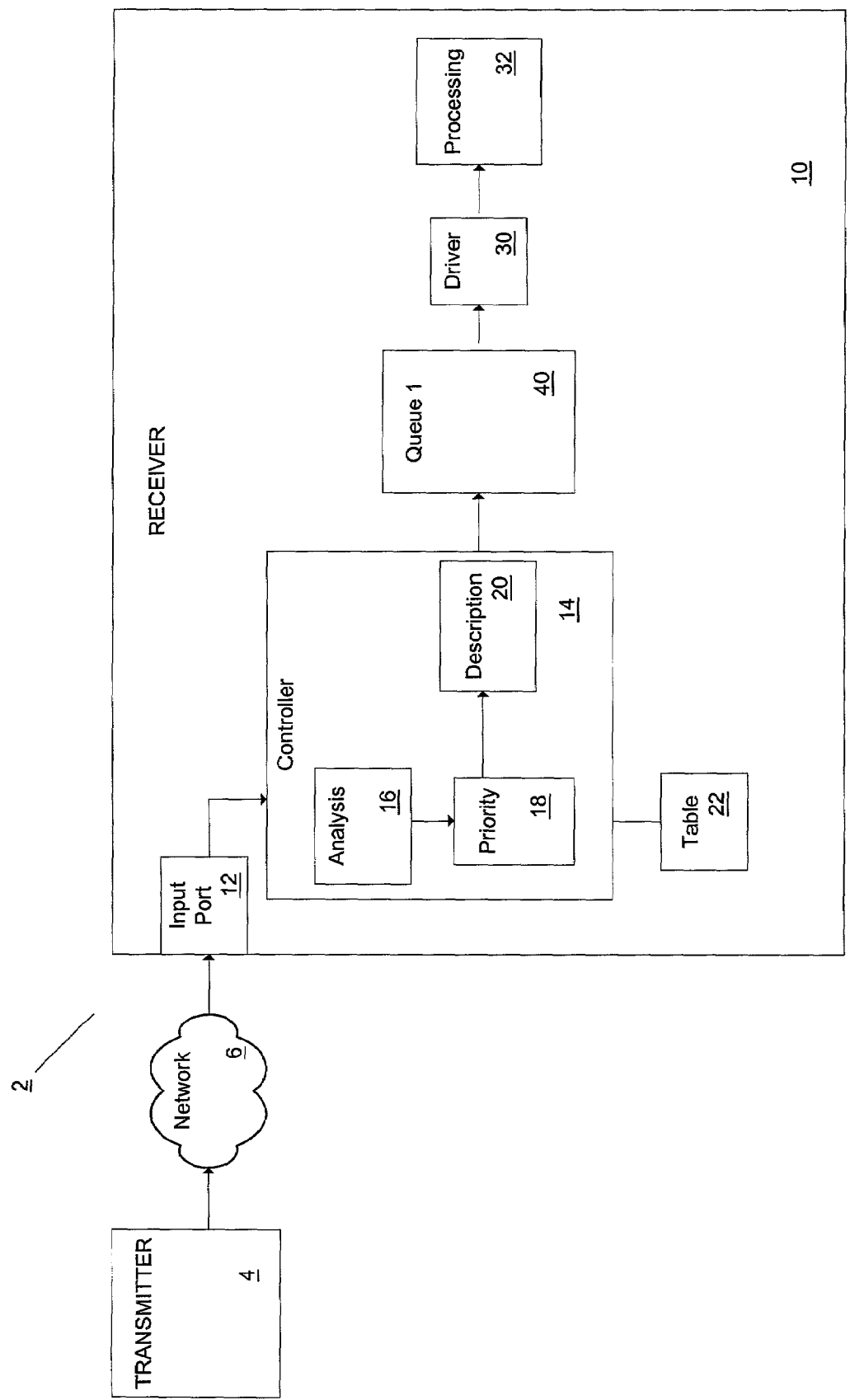

FIGS. 1A and 1B illustrate various embodiments of receiver stations to obtain packets from across the network in an exemplary network transmission environment 2, according to the present invention. A transmitter station 4 is provided to organize data into packets and send the packets into the network 6 to a receiver station 10. The receiver station 10 has components to analyze and associate a priority level to a received packet for use in prioritizing the processing of the packet.

The network 6 may be any set of nodes interconnected through communication paths. The network often uses Transmission Control Protocol (TCP) (Darpa Internet Program Protocol Specification, RFC 793, 1981) or other network protocols for communication. For example, the network may be the Internet using TCP with Internet Protocol (TCP/IP) (RFC 971, 1981, and updated in RFC 1349), an intranet or extranet, a local area network (LAN), e.g. an Ethernet system (according to the IEEE 802.3 standard, published in 1980), and the like.

Although FIGS. 1A and 1B demonstrate particular layouts of a packet transport network environment, the scope of the present invention anticipates that any number of receiver stations may receive packets from any number of transmitter stations, which may be arranged in various fashions within the network environment. In one embodiment, a network path for transmission of data has multiple transmitter stations and receiver stations. The assignment of transmitter stations and receiver stations may also be dynamically varied, where any given receiver station that is intended to receive and prioritize a packet may also be designated as a transmitter stations for the purpose of sending the packet to another receiver station.

Furthermore, the network may include other various nodes that are interconnected to form the network environment. For example, the pathway in the network from the transmitter station to the receiver station may include a variety of intermediary devices in addition to the transmitter station and receiver station of the present invention, such as switches, routers and/or servers that forward the packets to the receiver station.

The transmitter station 4 may be any computer, such as a personal computer or server, or other electronic device that sends the packets across the network. The transmitter station may package the information according to TCP or other similar protocols.

In one embodiment, the transmitter station that creates the packets of information also includes prioritization software to establish packet priority ranks before sending the packets. These pre-designated priority values are for intended use by the receiver station and/or intermediate nodes, e.g. according to the IEEE 801.2p standard protocol (IEEE P802.1p/D4, published Sep. 6, 1996). The IEEE 802.1p standard is a software protocol that allows a transmitter station to attach a pre-designated priority value to all of the packets used to transfer a body of data. The values range from 0 to 7. Each packet is tagged with the pre-designated priority value in a tag control information (TCI) field, such as a 3-bit field. The tag field is placed in a Layer 2 header between a source address field and a type/length field. A traffic prioritization utility, such as Intel® Priority Packet software (from Intel Corporation, Santa Clara, Calif.), enables a user, to tag packets before the information is sent into the network.

Thus, packets may be provided with pre-designated priority values before being sent into the network. However, the transmitter station may also send the packets into the network without such tags.

The receiver station 10 is a device that obtains, prioritizes and processes the packets. The receiver station may be the packet's final destination, such as an in-station computer, e.g. personal computer or server, which the transmitter station intends to ultimately receive the packet. The receiver station may also be any intermediary network device, such as a router or switch, that relays the packet through the network to other nodes or to the packet's ultimate destination. Accordingly, a receiver station may be functional to receive and process packets or to also transmit packets.

The receiver station 10 has an input port 12, e.g. an Ethernet port, to intercept the packet stream from the network. The received packets are passed to a controller 14 to determine packet properties. The controller has an analysis unit 16 to inspect the packets and determine one or more properties of the packets. Typically, each received packet that is to be processed is assessed for packet property. Often, the analysis unit examines the packet by parsing and reading the packet headers.

Figure 2:
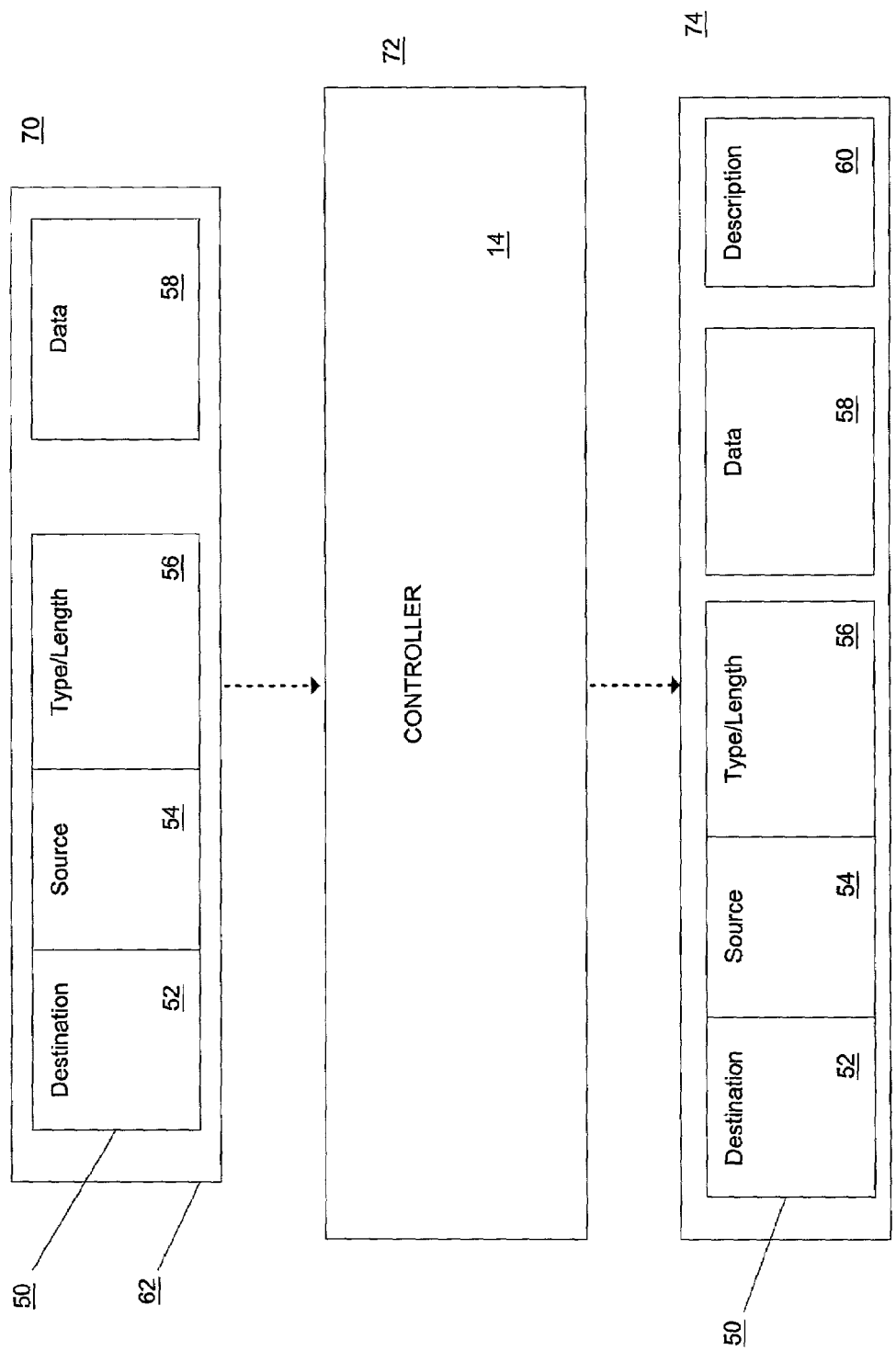
FIG. 2 is a block diagram representation of a packet with a header and the steps of attaching a packet description to the packet.

An exemplary packet 62 having a header 50 and data 58 is shown in FIG. 2. The header may have a destination field 52, a source field 54 indicating the originator of the packet, and/or type/length field 56. In addition, there may be numerous other header fields, for example that may include bits to indicate verified checksums, the types of headers provided in the packet, an error check field to specify if a package or data content has been damaged. Other headers may be specific for standard protocols, such as IP and TCP. At times, the packet may also include proprietary headers that are specific to the originator of the data.

A packet property suggests any classification or type of data that may be contained within the packet. Some properties of packets may include an acknowledgment, a video, an audio, connection setup or teardown, HTTP or FTP file transfer, file copy, etc.

In one embodiment, the analysis unit determines packet property by reading the header bits in the type/length field 56 that represent the category of data contained within the packet. In another embodiment, the determination of packet property is interpreted by assessing the size of the packet, e.g. reading the bits in the type/length field 56 that specify the length size of the entire packet in bytes. Certain packet sizes may suggest a particular packet property. For example, a small packet size, e.g. 64 bytes, may be indicative of an acknowledgment packet for Ethernet, so where a header field specifies 64 bytes size, the property is assumed to be an acknowledgment.

The packet property, once determined, is used to associate a priority level to the packet by a priority unit 18 of the controller 14. The priority level may be used for expedited, delayed or normal ordered, i.e. maintain the present packet order, processing of a packet. The priority level may be a value falling within a particular range, such as high, medium or low. In the alternative, the priority level may simply mark a packet as having priority or as having no priority compared to other unmarked packets, rather than being a value selected from a range of values.

Usually, a priority table 22 is provided to specify the packet properties and corresponding priority values, for reference by the controller components, e.g. priority unit 18. The priority value is used to determine the priority level for the packet. In some cases, the priority value may be the priority level or may be considered in a procedure to ascertain the priority level. In still other cases, the value is the priority level for the packet. More than one property of the packet, each property having the same or different values, may be considered in determining priority level for the packet. The table may denote any number of packet properties and priority values, including one property and value. Furthermore, in one embodiment, some of the different packet properties may have the same priority value.

In various cases, a packet may include a combination of properties. For example, a packet may include an acknowledgment that is "piggybacked" with other properties of data, e.g. other types of data content. The receiver system may have a rule to apply in determining priority level for such combination packets.

In one instance, the priority level that is associated with a packet having a combination of properties is a selected one of the multiple packet properties. The controller may establish the highest priority value of the properties included in the packet as the priority level for the packet. For example, where an acknowledgment property has a value of 5 and a video property has a value of 4, a packet including both acknowledgment and video types of data would be associated with a priority level of 5. In other rules for assigning a priority level, the packet table includes a super-priority designation for at least one special packet property that is to be expedited and/or a sub-priority for particular packets that are to be delayed. For example, an acknowledgment packet property may be specified as a super-priority property and the value for acknowledgment packets is chosen as the priority level despite the presence of other packet properties. In still another circumstance, the rule may dictate that all or select combination packets be excluded from reprioritization by the receiver station. Therefore, the receiver station does not alter the order in which such excluded combination packets are processed.

Another rule to associating priority levels for combination packets involves adding at least some of the priority values of the various packet properties, i.e. at least two values, and the priority level is the sum of those priority values. For example, where a packet includes an acknowledgment property having a value of 5 and video property having a value of 4, a priority level of 9 may be associated with the packet. In another example, where an acknowledgment property is listed as a high priority and video property as medium, the priority level may be defined as medium-high.

Furthermore, oftentimes a packet already has a priority that is set before the packet is received by the receiver station, such as a priority designated by the transmitter station or some other intermediate node in the network. Pre-designated priority values may include a layer 2 priority as defined by IEEE 802.1p, Internet Protocol (IP) priority information in layer 3, or other such priority defined before a packet arrives at the receiver station.

In the case of a pre-designated priority value attached to a packet, the controller may associate a priority level preferred by the receiver station and according to a rule of the receiver station. In one embodiment, the controller simply ignores the pre-designated priority value in determining a priority level for the packet. For example, the packet's priority is redefined based on a priority value in the priority table and the pre-designated priority value is not considered. In the alternative, the priority level may be determined by adding the pre-designated priority value with a priority value defined at the receiver station, e.g. by the priority table, to establish the priority level for the packet.

At least one queue is provided in the receiver station to temporarily store the packets after a priority level has been associated with the packet. In one embodiment, the receiver station may have multiple queues 24, 26 and 28 where one or more of the queues may be designated or a particular priority level. For example, queue 24 may be assigned to hold low priority level packets, queue 26 may be for medium priority level packets and queue 28 is to contain high priority level packets. As another example, only queue 28 may be for high or low priority packets and all other queues 24, 26 are non-select for a particular priority level. In one embodiment, the number of queues provided is equal to the number of possible priority levels that are available to associate with packets. However, any number of queues may be present in the receiver station, e.g. 1 to 32, and more usually 4 to 16 queues. In this embodiment of receiving station, the controller may place a packet into an appropriate queue assigned to the packet's priority level.

A driver 30 may be provided to remove the packets from queue for the packets to be processed. Typically, the packets are withdrawn from queue in the order of their priority level and/or in the order in which they will be processed. In one example, when the driver is to retrieve packets for processing, it may check for any packets in high priority queue 24 and extract those packets first. When high priority queue 24 has been emptied, the driver may check for any packets in medium priority queue 26 and withdraw those packets before removing the packets from low priority queue 28. However, in some cases, as the lower queues are being emptied, new packets may be received and placed into higher queues than the current queue. Therefore, the higher queue(s) may be continually checked for new packets. For example, after extracting and processing a packet from a queue, a higher priority queue may be checked for new packets before returning to pull packets from the current queue or a lower priority queue.

A processing unit 32 is to receive packets removed from queue and to perform processing operations on the packets in an order that is controlled by the priority system. The processing unit 32 includes software to process a packet. The processing unit 32 may be a modular protocol stack for processing the protocols used to create the packets, such as TCP/IP protocol stack. Some exemplary processing procedures include decrypting of packet information, verifying of checksums, assembly of the packets into larger data files, such as web pages, etc. For receiver stations that are routers, a routing process is run to read the destination address, calculate the best route and then send the packet toward its final destination. At times, the processing unit may includes software that determines the processing priority order for a packet based, at least in part, on the priority level for the packet.

The processing unit 32 processes the packets that have received a priority level, in an order based, at least in part, on such priority level. Often, the packets are processed in the order of the associated priority level, e.g. packets with the highest priority level are processed first and/or the lowest priority level packets are processed last. However, in another embodiment the priority level is one factor that is considered among other optional factors in determining the processing priority order. For example, sequence position of the packet in the stream may be a factor that is contemplated in controlling processing order. In other embodiments, the priority level or other factor may be used as a weight factor that allows N packets of a higher priority to be processed before N-Y lower priority packet are processed. Several types of queue processing algorithms, e.g. weight algorithms or similar algorithms, are well known in the art.

Where the packet includes a pre-designated priority value as well as a priority level, the receiver station may consider the priority level and disregard the pre-designated priority value in determining the order of processing. In another instance, the receiver station may consider both the pre-designated priority value and priority level in determining the processing priority order of a packet.

In one embodiment of receiver station as shown in FIG. 1B, a descriptor unit 20 is employed to associate priority levels by writing a packet description to a packet. The packet description is a string of bits that represents the priority level established by the priority unit of the controller.

Where a packet description is attached to a packet, the packet may be placed into any queue. For example, one queue 40 may be used to store all of the packets until the packets are removed for processing. In an alternative case, a packet having a first priority level signified in a packet description, may also have a second priority level associated by placing the packet into a particular queue for the second priority level. The packet with this kind of layered priority levels is then retrieved and processed in a sequence based on both its packet description and the priority queue in which the packet resides.

An exemplary method of attaching a packet description to one embodiment of packet is illustrated in FIG. 2. The packet 62 with header 50 enters the receiver station 70. The controller 14 inspects the packet 72, whereupon the descriptor unit of the controller attaches a packet description 60 to the packet 74. Usually, the packet description is separate from the header 50, so that for determining the proper processing order, the header need not be later parsed in order to read the packet description. However, in other embodiments, the packet description may be a field in the header 50. The packet description includes a priority level associated with the packet. In some embodiments, the packet description may also include various information in addition to the priority data, such as status data, location of the packet, length of the packet, errors, etc.

In addition to the receiver station components described and shown with regards to FIG. 1, other embodiments of the receiver station may have additional various components coupled in a variety of ways that assist in processing packets based on a priority level.

In general, the receiver station has components to order packet processing including receiving packets from a network, identifying a property for at least one of the packets, associating a priority level based on the property with the at least one packet, inserting the at least one packet into a first queue, and processing the at least one packet in an order based, at least in part, on the priority level. Furthermore, the receiver station may associate a priority level with at least a second packet, insert the at least second packet into a second queue and process the at least second packet in an order based, at least in part, on the priority level of the second packet.

Figure 3A:
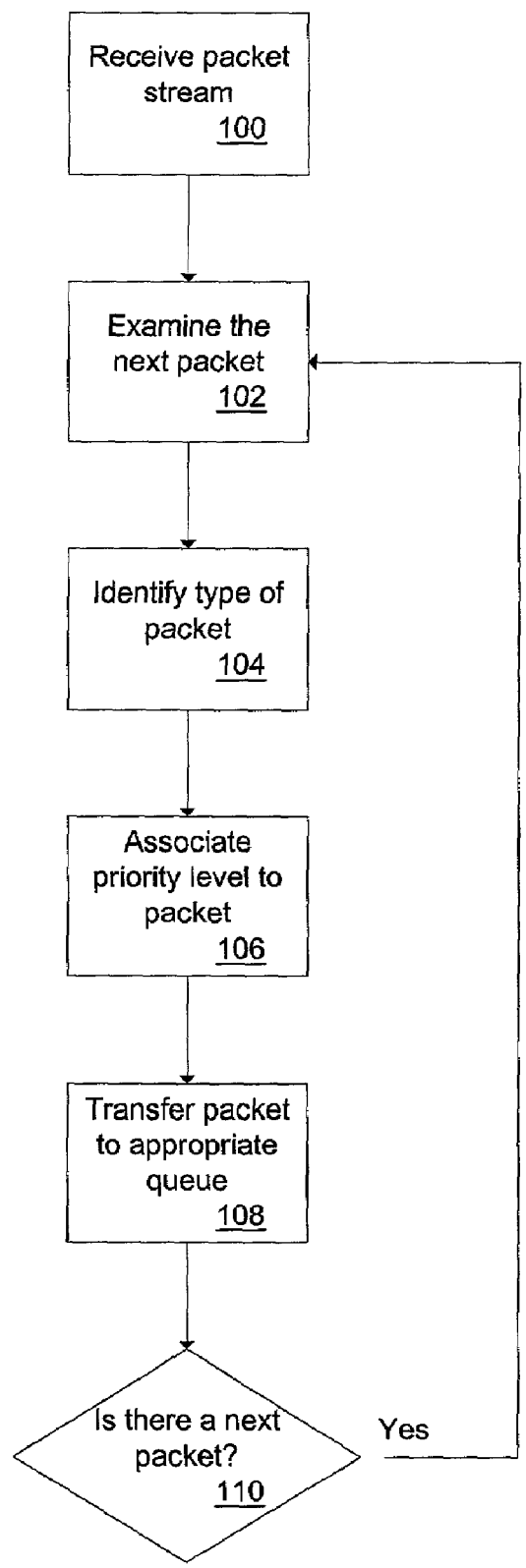

An exemplary method to prioritize packets for later processing by the use of multiple queues is shown in the flow chart of FIG. 3A. The receiver station obtains a stream of packets 100 from the network. A stream of packets refers to all packets arriving at a receiver station over a given period of time. Typically, the packets arrive sequentially from one or more sources. But where a receiver station has multiple input ports, some packets may be simultaneously received. The packets in the stream are examined 102, usually in the order in which they arrive, and a property of one or more of the packets is determined 104. The examination may be conducted by reading the packet's header to reveal the property of that packet. A priority level is associated with the packet 106 based on the property of the packet. Thus, priority is dependent on this determined packet property, e.g. content type, rather than the actual data comprising the packet content.

The packet is placed into the particular queue that is designated for the priority level of the packet 108. Where another packet is in the stream of received packets, the receiver station may repeat the process by examining the next packet in the stream 110. During the initial pass for a stream of packets, the first packet(s) of a stream may be examined. For each subsequent pass, the following next packet in the stream may be inspected and so on for all received packets. If there are no more next packets, the receiver station may await for the next stream of packets to arrive and then begin the process over again, simply end the process or continue on to additional steps.

Figure 3B:
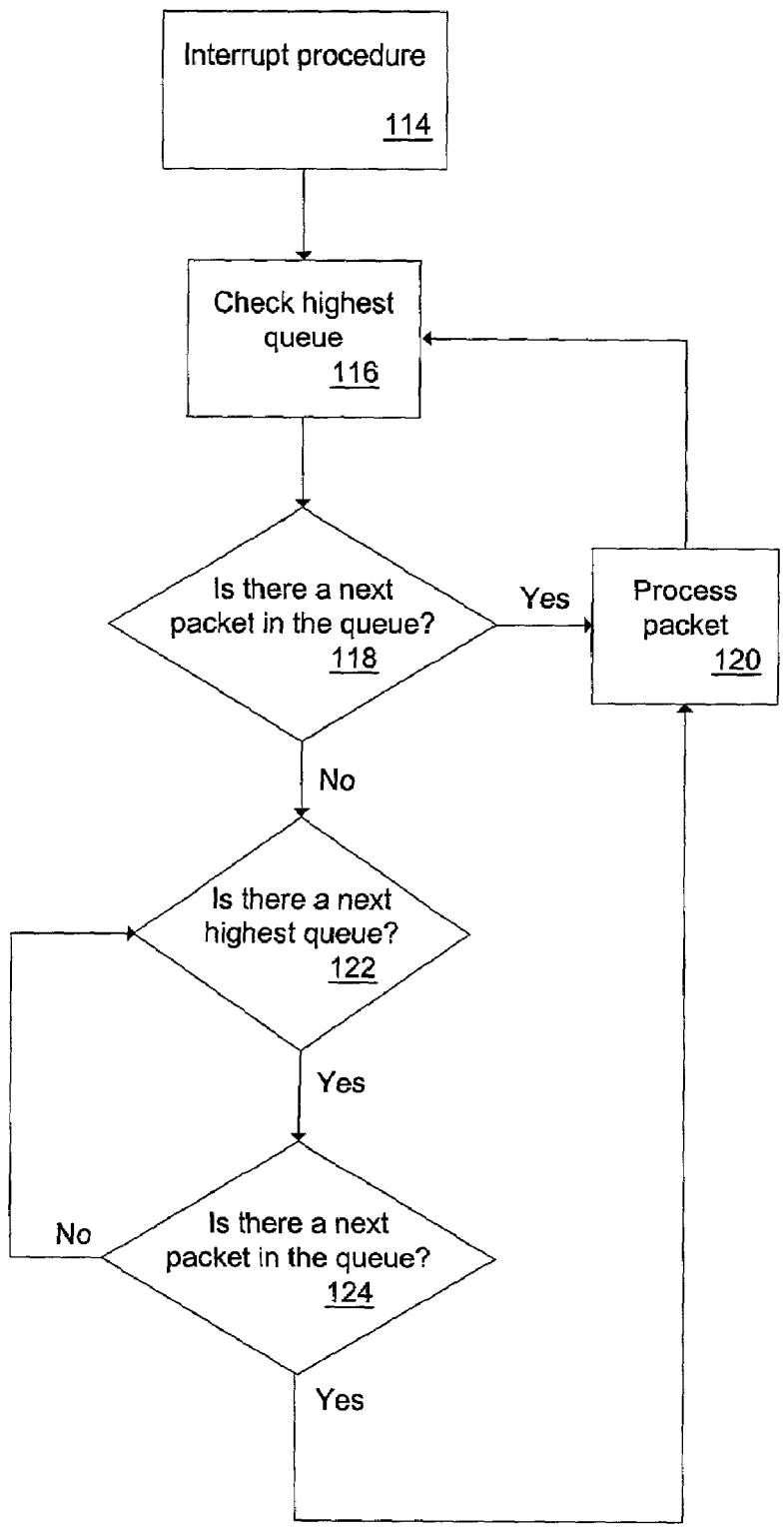

The packets may be processed in a sequence at least partially based on the priority level by the receiver station at the appropriate time for processing according to one exemplary method shown in FIG. 3B. The initiation of the processing may begin through an interrupt procedure 114.

In one embodiment for processing, the driver begins pulling packets from the various queues when it is time for the packets to be processed. In some embodiments, as soon as all of the packets are placed into their appropriate queues, a driver interrupt procedure may be initiated, such as by the controller, to notify the driver that packets have been placed in a queue. In response, the driver may initiate a handler interrupt procedure to remove the packets from queue. Thus, the removal and processing of packets begins as soon as all of the packets are placed in the appropriate queue. In the alternative, the driver may respond to the notification by signaling that the driver will remove the packets at a later time, such as when the processing software code starts to run. In this situation, the running of processing software may initiate the removal of packets from their queue locations.

In any case, when the processing is to begin, the driver selects the highest queue 116 and the next sequential packet from the queue 118 is processed 120. The packet is processed by any procedures of the receiver station software for the property of packet. Initially, the first packet of a stream from the highest priority queue may be withdrawn and processed 118, followed by the next subsequent packet in that queue. Where there are no packets in the highest queue, the next highest queue, if any may be checked 122. The next packet in that queue 124 is processed 118. After processing the packet, the procedure may return to check the highest queue, in case more packets have been added to that queue. The procedure steps through each queue in this manner. When all packets in a particular queue have been pulled, the packets in the next highest queue may be treated in the same manner. The procedure may repeat until all packets in all queues have been pulled and processed. At that time, the procedure may await the next inbound packet stream to be ready for processing by the receiver station, simply end the procedure, or continue on to further steps.

Figures 4A, 4B:
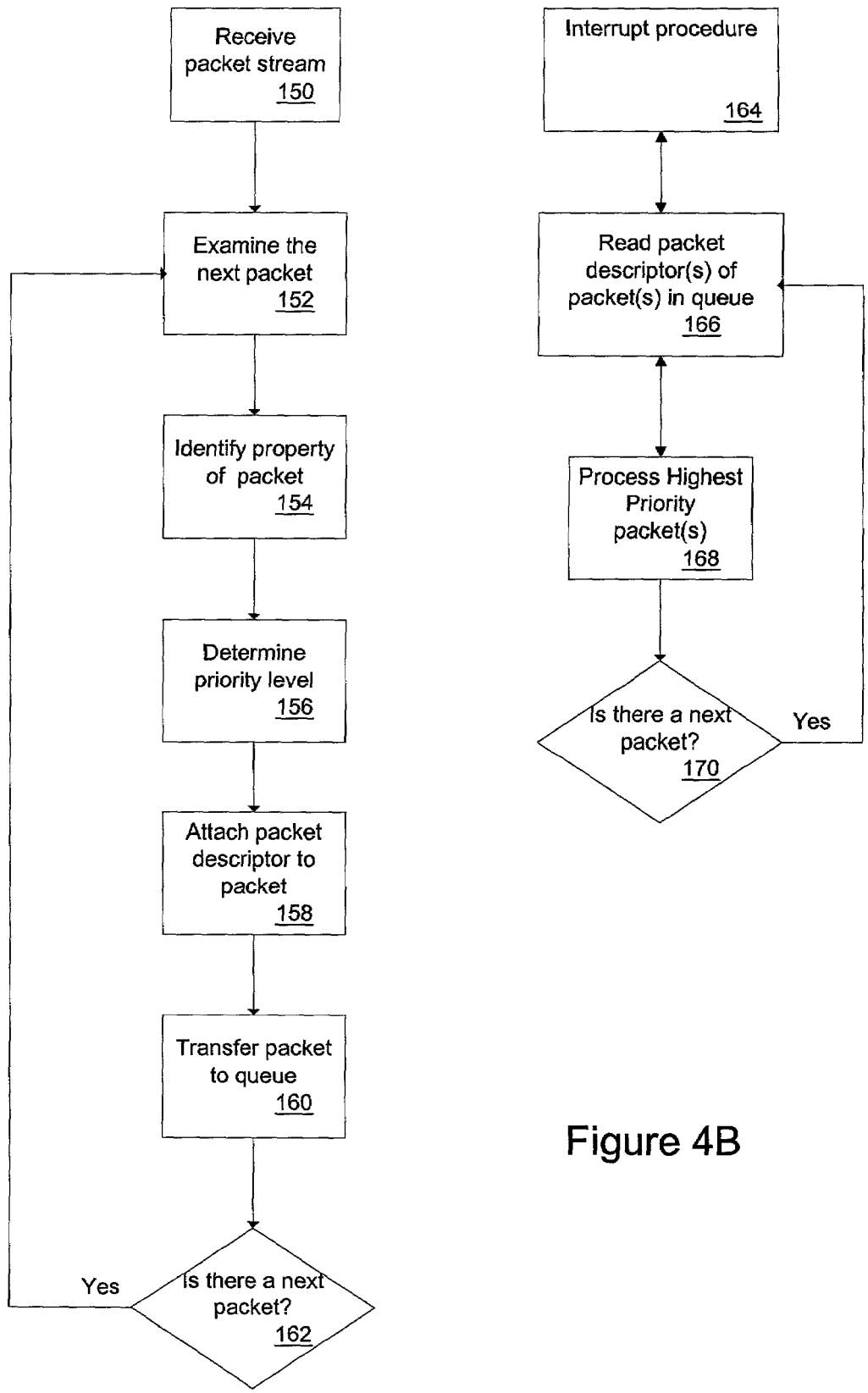

Another embodiment of the method to control processing order by the use of a packet description, is shown in flow chart in FIG. 4A. The method determines whether a packet should jump ahead in a queue order, maintain its order, or be held back. The receiver station receives the packet stream from the network 150 and may examine the next packet in the stream 152, such as the first packet(s) or a stream and thereafter the next sequential packet in the stream. In one embodiment, packets regularly flow into the receiver station and each packet is inspected.

The packet property is identified 154. The priority level is associated to the packet by determining the priority level 156 and attaching a packet description to the packet 158. The packet may be transferred to a queue 160. Usually for this embodiment, any indiscriminate queue may be used which does not need to correlate with a particular priority level.

As shown in FIG. 4B, the packet descriptor is used in controlling the order of processing packets. When it is time to process a packet, oftentimes an interrupt procedure initiates the processing 164.

Where the packets are placed into a queue without regard for the priority level, the packet descriptors of all of the packets in the queue are read 166 to assess the priority level of each packet. In one embodiment, the packets may be read one by one and in order of their place in the initially received stream of packets. In some embodiments, the packet having the highest priority may be removed from queue. Where more packets have entered the queue, each packet may be assessed during each processing repetition, in order to ensure that the absolute highest priority packet at any given time is processed. The highest priority packet may be then processed 168. Each subsequent packet may be processed in order of priority based, at least partially, on priority level 170 and also optionally, sequence position of the packet in the stream, until all packets have been processed. The procedure may then repeat for next packets to be processed, simple end or continue to desired additional steps.

In addition to the steps described by way of FIGS. 3A, 3B, 4A and 4B there may be other steps included in the method of ordering the processing of received packets according to the present invention. For example, the receiver station may authenticate the packets prior to inserting the packets into a queue. In addition, one embodiment of receiver station also has a packet memory buffer and the packets are temporarily placed into the buffer until all packets of a stream are collected. At that time, the controller may begin to examine each packet. In other embodiments, the procedures of FIGS. 3A, 3B, 4A and 4B are combined to use multiple priority queues and packet descriptions.

Figure 5:
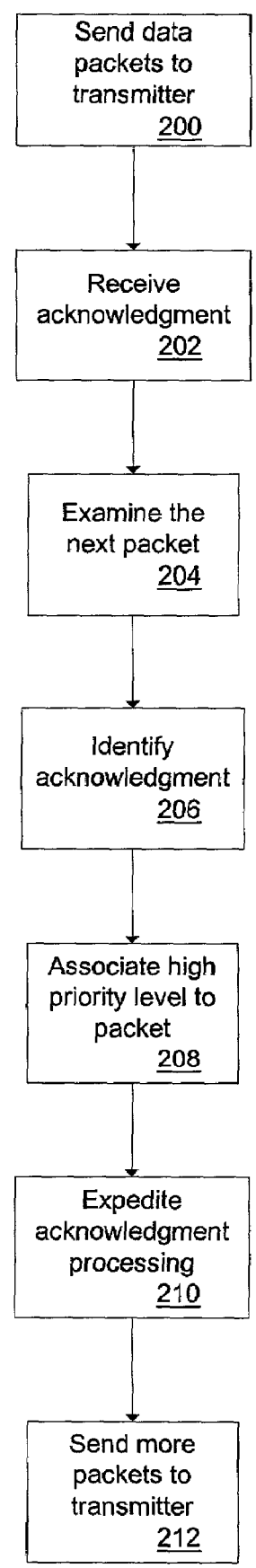
FIG. 5 is a flow chart depicting an exemplary method for expediting the processing of acknowledgment packets, according to one embodiment of the present invention.

In one specific embodiment of the present invention, the priority system is used to accelerate the processing of acknowledgment packets. The process, as shown in FIG. 5, includes a receiver station sending packets to a transmitter station 200 and, in return, the receiver station receiving a packet having an acknowledgment priority from the transmitter station 202. The packet having the acknowledgment may be one packet of several other packets that have different other properties received in a stream. Each packet that arrives at the receiver station may be examined 204. The acknowledgment packet is identified 206 and is associated with a high priority level 208. The association of a high priority level may occur by placing the acknowledgment packet into a special queue, by attaching a packet description, or by both procedures. However, after being placed into a queue, the receiver station recognizes the high priority of the acknowledgment packet and may immediately process this packet 210. Usually the acknowledgment packet is processed prior to the processing of all, most or at least one other packets that may have been received prior to the time the acknowledgment packet arrived, but not yet processed. After processing the acknowledgment packet, the receiver station may be permitted to send further packets, if any, to the transmitter station 212.

Figure 6:
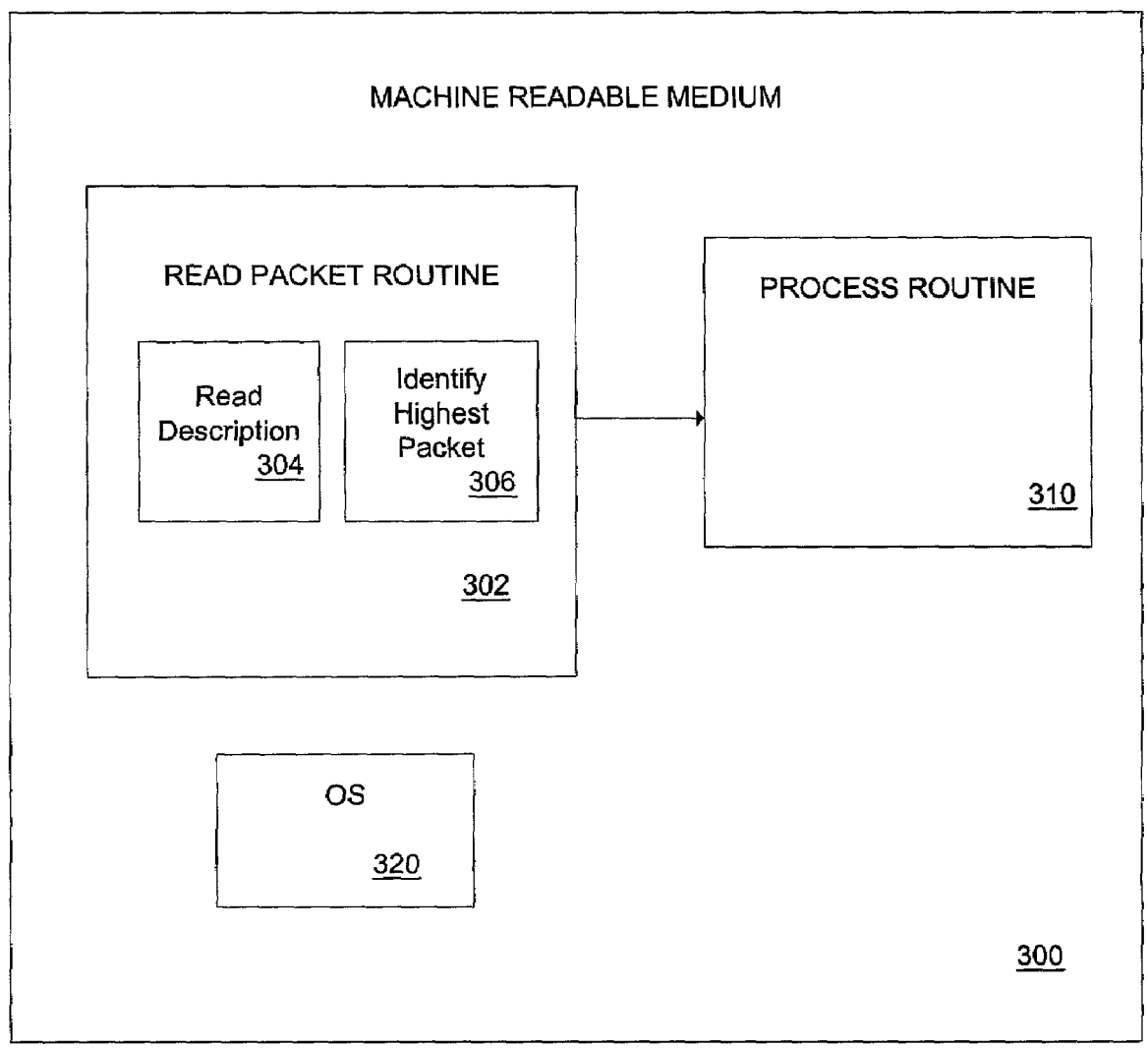
FIG. 6 is a block diagram of a machine-accessible medium storing executable code and/or other data to provide one or a combination of mechanisms to prioritize the processing of received packets, in accordance with one embodiment of the present invention.

Some software components, e.g. applications programs, may be provided within or in communication with the receiver station that cause the processor or other components of the device to execute the numerous methods employed in controlling the order of processing received data packets. FIG. 6 is a block diagram of a machine accessible medium, e.g. computer-readable medium, storing executable code and/or other data to provide one or a combination of mechanisms for facilitating the ordered processing of packets, according to one embodiment of the invention.

The machine-accessible storage medium 300 represents one or a combination of various types of media/devices for storing machine-accessible data, which may include machine-executable code or routines. As such, the machine-accessible storage medium 300 could include, but is not limited to one or a combination of a magnetic storage space, magneto-optical storage, tape, optical storage, battery backed dynamic random access memory, battery backed static RAM, flash memory, etc. Various subroutines may also be provided. These subroutines may be parts of main routines in the form of static libraries, dynamic libraries, system device drivers or system services.

The machine-accessible storage medium 300 is shown having read packet routine 302, which, when executed, manipulates units through various subroutines. A read packet descriptions subroutines 304, when executed shifts through all, most, or selected packets in a queue and reads the packet descriptions attached to these packet. An identify highest packet subroutine 306 is for determining which of the packets has the highest priority level compared to the other packets in the queue, as indicated by the packet description.

The machine-accessible storage medium 300 also is depicted as having an optional processing software routine 310. The procedures of this processing software routine 310 and its subroutines, if any, may be executed to perform a variety of tasks known in the field. In addition, other software components may be included, such as an operating system 320.

The present invention has been described above in varied detail by reference to particular embodiments and figures. However, these specifics should not be construed as limitations on the scope of the invention, but merely as illustrations of some of the presently preferred embodiments. It is to be further understood that other modifications or substitutions may be made to the described the broadcast processing system as well as methods of its use without departing from the broad scope of the invention. The above-described steps of processing and storing broadcast data may be performed in various orders. Therefore, the following claims and their legal equivalents should determine the scope of the invention.

What is claimed is:

1. A method of controlling the order of processing packets, the method comprising:

receiving packets from a network;
identifying a property for at least one of the packets;
associating a priority level based on the property with the at least one packet, wherein the at least one packet has a pre-designated priority value and the associating of the priority level includes disregarding the pre-designated priority value;
attaching a packet description for the priority level to the at least one packet;
inserting the at least one packet into a first queue; and
processing the at least one packet in an order based, at least in part, on the priority level.

2. The method of claim 1, further including:
associating a priority level with at least a second packet;
inserting the at least second packet into a second queue; and
processing the at least second packet in an order based, at least in part, on the priority level of the at least second packet.

3. The method of claim 1, wherein inserting into the first queue includes packets having different priority levels.

4. The method of claim 3, further including reading the packet descriptions for the packets in the queue and determining the order for processing based, at least in part, on the packet description.

5. The method of claim 1, wherein the at least one packet has more than one property with different priority values and the priority level is a select one of the priority values.

6. The method of claim 1, wherein the at least one packet has more than one property with priority values and the priority level includes the sum of at least some of the priority values.

7. The method of claim 1, wherein the property is an acknowledgment packet.

8. The method of claim 7, wherein the identifying of the property is by determining the packet size.

9. The method of claim 7, wherein the acknowledgment packet is processed prior to the processing of other packets received.

10. The method of claim 1, performed by a final destination receiver station on the network.

11. A receiver station to control the order of processing packets, comprising:
an input port to receive packets from a network;
a controller to identify a property for at least one of the packets and to associate a priority level based on the property with the at least one packet and further to attach a packet description for the priority level to the at least one packet and to insert packets having different priority levels into the same queue, wherein the at least one packet has a pre-designated priority value and wherein the controller is to associate the priority level by disregarding the pre-designated priority value;
at least a first queue to accept the at least one packet; and
a processing unit to process the at least one packet in an order based, at least in part, on the priority level for the at least one packet.

12. The receiver station claim 11, wherein the controller is further to identify a different property for at least a second packet, to associate a priority level with the at least second packet, and to insert the at least second packet into a second queue for the priority level of the at least second packet.

13. The receiver station of claim 11, further including a driver to further read the packet descriptions for the packets in the queue and to determine the order of the packets.

14. The receiver station of claim 11, wherein the at least one packet has more than one property with different priority values and the priority level is a select one of the priority values.

15. The receiver station of claim 11, wherein the at least one packet has more than one property with priority values and the priority level includes the sum of at least two of the priority values.

16. The receiver station of claim 11, wherein the property is an acknowledgment packet.

17. The receiver station of claim 16, wherein the controller is to identify the property by determining the packet size.

18. The receiver station of claim 16, wherein the processing unit is to process the acknowledgment packet before processing the other packets received.

19. The receiver station of claim 11, wherein the receiver station is the final destination for the packet.

20. A method of controlling the order of processing packets, the method comprising:
receiving a stream of packets from a network;
identifying an acknowledgment property packet, the acknowledgment packet having a pre-designated priority value;
associating a high priority level to the acknowledgement packet, wherein associating the high priority level to the acknowledgement packet includes disregarding the pre-designated priority value;
placing the acknowledgement packet into a priority queue;
placing the other packets into at least one other queue;
removing the acknowledgement packet from the priority queue before removing the other packets from the at least one other queue; and
processing the acknowledgement packet before processing the other packets.

21. The method of claim 20, wherein the at least one packet has a pre-designated priority value and wherein the associating the priority level includes disregarding the pre-designated priority value.

22. The method of claim 20, wherein the at least one packet has more than one property with different priority values and the priority level is a select one of the priority values.

23. The method of claim 20, wherein the identifying of the property is by determining the packet size.

24. The method of claim 20, performed by a final destination receiver station on the network.

* * * * *